United States Patent [19]

Casagrande

[11] 4,199,220
[45] Apr. 22, 1980

[54] LENS SYSTEM WITH RETICLE AND DIFFUSER GLASS

[76] Inventor: John T. Casagrande, 2606 N. Parish Pl., Burbank, Calif. 91504

[21] Appl. No.: 941,463

[22] Filed: Sep. 12, 1978

[51] Int. Cl.² .................. G02B 7/04; G03B 13/18; G02B 27/32; G02B 27/40
[52] U.S. Cl. ........................... 350/78; 356/251; 358/55; 358/227; 354/195; 352/139
[58] Field of Search ............ 350/78, 79, 10, 238, 350/239; 356/125, 127, 251, 253, 254, 255; 358/55, 225, 227; 354/195; 352/139, 140

[56] References Cited

U.S. PATENT DOCUMENTS

| | | | |
|---|---|---|---|
| 1,442,015 | 1/1923 | Tillyer | 356/251 |
| 2,405,063 | 7/1946 | Sisson | 356/251 |
| 2,472,809 | 6/1949 | Decker | 356/251 |
| 3,293,357 | 12/1966 | Yoshikazu et al. | 358/55 |
| 3,721,488 | 3/1973 | Kuhne | 356/125 |
| 4,109,279 | 8/1978 | Hirose et al. | 358/55 |

Primary Examiner—Jon W. Henry
Attorney, Agent, or Firm—Roger A. Marrs

[57] ABSTRACT

A lens system is disclosed herein having a pair of telescoping tubes coaxially related to each other so that their central axes are coextensive. A selected one of the tubes carries a collimating lens while the other tube carries a reticle and a diffusing glass. A locking set screw fixes the pair of tubes in an optically correct relationship to each other. A mounting flange is threadably attached to the end of the lens tube opposite to its end in telescoping or sliding relationship with the reticle tube so that the lens unit may be detachable carried on a selected camera lens or camera.

1 Claim, 4 Drawing Figures

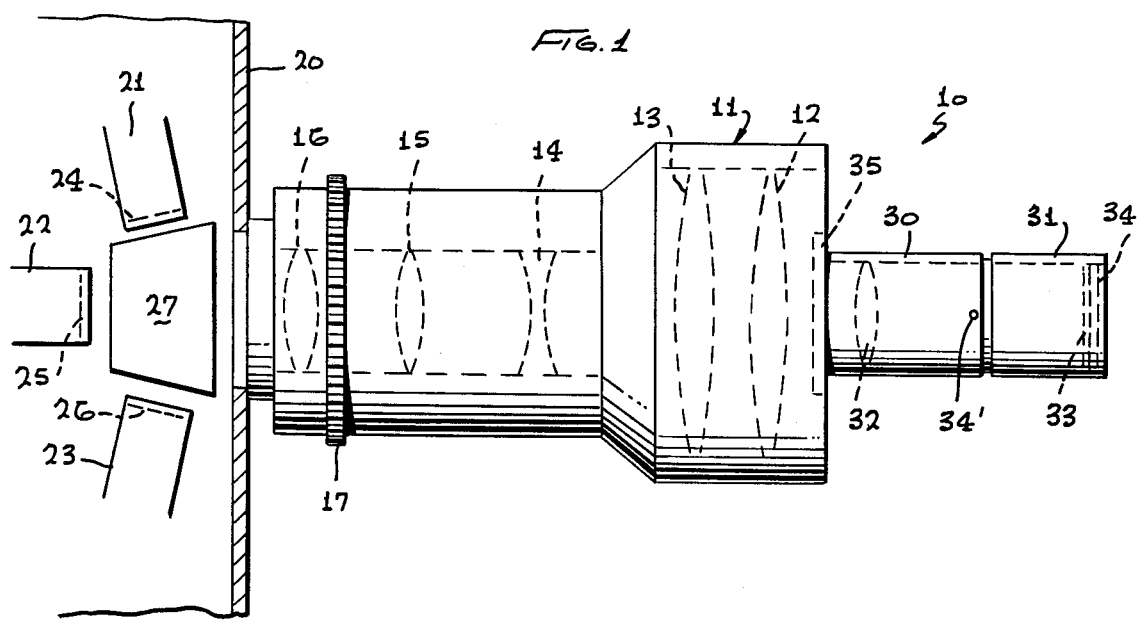
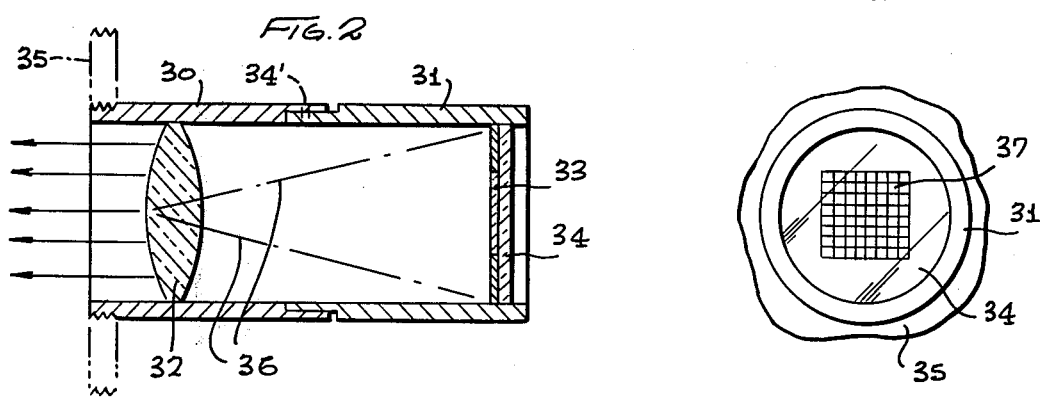
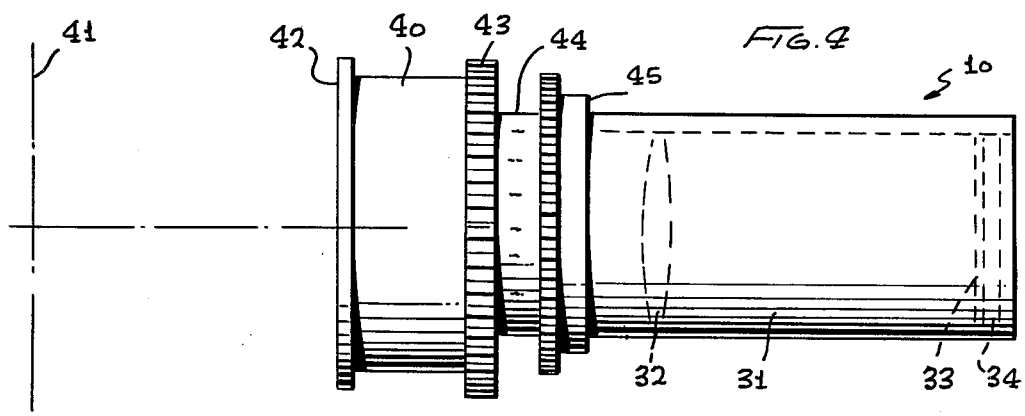

LENS SYSTEM WITH RETICLE AND DIFFUSER GLASS

BACKGROUND OF THE INVENTION

1. Field of the Invention

This invention relates to lens systems and more particularly to a novel lens system of image formation and photographic recording which insures that an image will be in focus on the image plane of a still, TV or movie camera.

2. Description of the Prior Art

Conventionally, in most optical systems for image formation and photographic recording such as in still photography and movie recording, the image plane in the system is in a fixed relationship with respect to a data plane on the camera body. It has been the conventional practice to establish the data plane as the lens mounting face on the front of the camera. The camera manufacturer, in order to provide the fixed relationship, provides various lenses designed which when used with their particular camera, assures that an image will be in focus on the image plane.

In some instances, attempts have been made to move the image plane with respect to the data plane and in such systems, the image plane is adjustable in terms of focus as well as focus adjustments on the lens used with the systems. This latter instance is employed mainly with color television cameras. In such cameras, three individual pick-up tubes are used so that three independently adjustable image planes are employed to compensate for any variance through a prism splitting system as well as variance in pick-up tube tolerance and dimensions. Also, television systems employ zoom lenses which, if not properly set, will not track focus throughout their full zoom range. For example, if the back focal distance between zoom lens and image plane is incorrectly set somewhere within the zoom range, the image will loose sharp focus.

In actual practice, the usual procedure for establishing a zoom lens camera combination is to point the camera with the lens attached at a distant object, at or near infinity, with the lens zoomed to the widest field condition. At this point, the lens to image plane distance is varied to achieve best focus. This procedure is accomplished with the lens at its wide open aperature so depth of focus is shallowest. The lens is then zoomed to narrowest angle and the lens focus adjusted for best focus. After moving the lens back and forth between wide and narrow zoom conditions two or three times, the lens camera is considered adjusted or best focused. From the foregoing, it can be recognized that two important conditions are impossible to achieve when employing the camera indoors. For example, there is no condition of infinity or distance objects available with which to achieve focus, and exteriors with high levels of illumination having the aperature wide open is impossible to reach except with neutral density filters.

Therefore, with the advent of electronic journalism, additional needs have been required for cameramen in the field to be able to change lenses and be able to quickly and accurately check camera lens back focal length relationships.

SUMMARY OF THE INVENTION

Accordingly, the above problems and difficulties have been obviated by the present invention which provides a novel lens system comprising a pair of coextensive and coaxially related telescoping tubes which are releasably mounted on the lens of a still or movie camera housing. One of these tubes carries a collimating lens while the other tube carries a reticle and a diffusing glass. Means are cooperatively provided for releasably securing the reticle and diffusing glass tube to the lens tube. Means are carried on the end of the lens tube opposite from its end slideably carrying the reticle and diffusion glass tube for mounting the assembled tubes to the face of the camera or a selected camera lens. By this means, the reticle tube holding the reticle and the diffusing glass is adjustable with respect to the lens in the lens tube so as to put the reticle at the focal length of the lens, thereby placing the reticle at infinity or other conjugate distances if desired or required.

Therefore, it is among the primary objects of the present invention to provide a focusing device to be used with still and movie cameras whereby the camera can be focused indoors within a given range such as when a zoom lens is employed to insure that the image will be in focus throughout the range of the lens.

Another object of the present invention is to provide a novel zoom tracking focus means which is operative throughout the full range of the zoom lens so that the lens in the focusing means is on the optical axis coincident with the camera optical axis.

Still a further object of the present invention is to provide a novel optical lens means to be carried on the standard lens of a still or movie camera which will permit accurate adjustment of the focal image or plane so that the recorded image will be in focus on the image plane.

Still a further object of the present invention is to provide a novel lens system which is fast to use and is a simple tool for camera lens adjustment.

A further object of the present invention is to provide a novel optical lens system and device which is used in combination with a camera zoom lens to determine zoom tracking focus through its full range and to determine whether or not an image shift exists or if the optical axis of the lens is in coincident with camera optical axis.

A further object of the invention is to provide a novel optical lens system and device which is used in combination with a camera and zoom lens to project various test pattern reticles to facilitate electronic alignment of the various camera parameters.

A further object of the invention is to provide a novel optical lens system and device which is used in combination with a camera and zoom lens or fixed focal length lens to project graphic information onto the image pick-up devices.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a diagrammatic side elevational view of a typical television color camera employing a zoom lens with the optical lens system and device of the present invention incorporated thereon;

FIG. 2 is a longitudinal cross sectional view of the novel lens system and device of the present invention as used in connection with the camera shown in FIG. 1;

FIG. 3 is a front elevational view of the lens device shown in FIG. 2 illustrating a typical reticle pattern; and FIG. 4 is a diagrammatic view of another version incorporating the present invention used as a lens standard to set or adjust a series of cameras or optical devices to a known and predetermined back focal distance or for measuring the same.

DESCRIPTION OF PREFERRED EMBODIMENTS

Referring to FIG. 1, the novel lens device or unit of the present invention is illustrated in the general direction of arrow 10 and the lens device is shown being carried on the front end of a typical standard zoom lens indicated in general by the numeral 11. The standard zoom lens 11 includes a plurality of lenses such as is identified by numerals 12, 13, 14, 15 and 16. The lenses are all arranged coaxially with respect to each other and are conveniently carried in a housing of cylindrical cross section. Usually, a pair of housings are telescopically related to each other so that by turning a ring 17, the housings will slide with respect to each other to the widest and narrowest range of the zoom lenses.

The zoom lens 11 is detachably connected to a camera 20 which includes three individual pick-up tubes identified by numerals 21, 22 and 23 respectively. Three pick-up tubes are required in color television cameras and the lens system for television cameras require that the image plane is adjustable in terms of focus as well as focus adjustments on the lens used with the system. The image plane for each of the pick-up tubes is identified in broken lines by the numerals 24, 25 and 26 respectively. Therefore, three independently adjustable image planes are employed so as to compensate for any variance through a prism splitting system employing the prism 27 as well as variance in pick-up tube tolerance and dimensions. As mentioned earlier, television systems use zoom lenses which if not properly set, will not track focus throughout their full zoom range. The device 10 of the present invention permits the user of the camera to adjust the focus throughout the full zoom range under conditions of low ambient light or where no objects are available at a far distance such as for infinity setting.

In further reference to FIG. 1, the novel lens means or device 10 includes a pair of telescoping tubes 30 and 31 which are arranged in sliding relationship with respect to each other. Tube 30 may be called a lens tube since it incorporates a conventional collimating lens 32 and tube 31 may be referred as a reticle tube since it contains a reticle 33. Also, immediately adjacent to the reticle 33, a diffusing disc 34 is incorporated therein. A locking means 34' is employed for securing the reticle tube 33 with respect to the lens tube 32 when adjustment has been made.

Referring in more detail to FIG. 2, it can be seen that the mounting ring 35 includes a threaded inner diameter and a threaded outer diameter so that the ring may be employed for adapting the lens device 10 to a variety of camera lenses or camera data plane. The ring may be of any suitable diameter and/or a variety of rings may be provided with the device for ready attachment to a desired camera or lens. The lens tube 30 incorporates a standard collimator unit so as to accommodate any lens. Although the flange or mounting ring 35 is illustrated, it is also contemplated that the selected end of tube 30 may be slipped or snap-locked into position with respect to a lens or camera face. Lens 32 is convex and can be of any diameter up to the diameter of the zoom lens and any focal length. Any suitable means may be provided for mounting the lens 32 within the bore of the lens tube 30. The reticle tube 31 is of substantially the same inner and outer diameters as the lens tube 30 and is coaxially disposed therewith. The reticle tube 30 suitably mounts and holds a reticle 33 and the diffusing glass 34. The reticle tube 30 is adjusted so as to put reticle 33 at the focal length of lens 32 thereby placing the reticle at infinity. The reticle tube 30 may also be used to put reticle 33 at some finite distance other than infinity. The locking set screw 34' is intended to hold the lens tube 30 and the reticle tube 31 in correct relationship with respect to one another so that the reticle is on the focal plane of the lens 32. Any suitable means for holding the tubes together may be employed. The diffusing glass 34 picks up direct or reflected light and illuminates the reticle 33. By panning the camera with the device attached thereto around the room to lighter or darker areas, a selected area can be found permitting the zoom lens to be opened to full aperture or various densities of diffusion can be provided by the glass 34. It is also conceivable within the scope of the present invention that a detachable portable lamp unit may be employed where needed although a flashlight would supply sufficient light at night for full aperture. Such a portable light could snaplock onto the end of a reticle tube 31.

Collimated light is shown by the arrows exiting from the lens 32 while light entering the lens is indicated within the confines of the broken lines 36.

Referring now in detail to FIG. 3, a typical pattern for a reticle is illustrated and the pattern is identified by numeral 37. Preferably, the pattern is a plurality of horizontal and vertical lines forming a grid so that a sharp focus may be obtained. It is within the scope of the invention to have several reticles or patterns available to perform other camera adjustments or to use different reticles to use a slating or camera identification system. It is also within the scope of the present invention to use the invention as a close-up graphics device for small pictures or objects with full zoom range capability.

In actual operation, a correct mounting flange 35 is screwed onto the ends of lens tube 30 and the unit 10 is screwed onto the front element of a test lens such as the zoom lens 11 in FIG. 1. The barrel focus of the zoom or test lens 11 is set at the infinity mark and the zoom mechanism is set to widest zoom condition. The back focus adjustment on the lens or camera or the individual image pick-up tube is varied until the reticle comes into sharp focus. The camera is panned or moved around until an illuminated area is found to enable the camera lens to be opened to maximum aperture to allow for shallowest depth of focus. In some cases, a light source will have to be directed on the diffusing glass 34 until the above illuminated condition is achieved. The lens is then zoomed to narrowest zoom condition and the barrel focus on lens adjusted for best focus. The lens is zoomed wide again and wide focus checked for sharpness. If sharpness is not obtained, the procedure is repeated. If sharpness is as required, the procedure is complete and the lens device 10 may be unscrewed from the lens 11 and the zoom lens is ready for immediate service.

From the foregoing description, it becomes apparent that the lens unit or device 10 of the present invention is a much needed fast and simple tool for camera lens adjustment. It also presents the user with other useful information such as, questions concerning zoom tracking focus through its full range, image shift information, and lens optical axis coincident with camera optical axis information. The reticle image can be used to perform other electrical and mechanical adjustments to set up a variety of camera mechanism. White balance is one of the many adjustments in the camera mechanism which could conceivably be much easier to achieve due to the diffusion disc or glass 34 and which would tend to integrate light of various color temperatures in the scene to one value. If desired, the diffusion disc or glass 34 may take the form of a sphere for better light gathering and better integrating action.

It is also to be understood that the present invention may be used as a lens standard to set or adjust a series of cameras or optical devices to a known and predetermined back focus distance or for measuring the same. To illustrate this application, reference is made to FIG. 4. The device consists of a standard photographic lens in this case, a 50 mm focal length f 2.8 lens. The lens is mounted in an adapter 40 arranged to fit a particular camera. The focus ring footage scale in the present instance does not read footage to the object, but is graduated in thousandths of an inch plus or minus the dimension between planes 41 and 42. This distance is, in effect, the focal length of 10 when focused at infinity. The flange 35 of device 10 is unscrewed from the lens tube 30 and the lens tube 30 is screwed into the adapter 45 which is on a camera to be measured or adjusted. By turning the focus ring 43 and bringing the reticle 33 into focus, proper adjustment can be determined. The back focal distance can be determined by reading the pointer on a focus scale 44 or the converse procedure followed, setting the focus scale to a predetermined reading and adjust camera focal plane for sharpest image. By using the same focal scale setting in series, a plurality of cameras can be set up by all having the same back focal distance making the inner changeability of lens and cameras possible.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A lens system comprising the combination of:
   an elongated housing having a pair of slidable telescoping tubes;
   a selected one of said tubes fixedly mounting a collimating lens;
   the other of said tubes carrying a reticle therein in coaxial alignment with said collimating lens;
   means cooperatively carried on said pair of tubes for selectively holding said tubes in a predetermined relationship whereby said reticle is on the focal plane of said lens;
   a camera;
   an adapter flange threadably carried on the end of said lens tube opposite to its end in slidable relationship with said reticle tube for mounting said housing onto a conventional camera or zoom lens construction;
   a diffuser glass mounted on said reticle tube in close proximity to said reticle and located on the opposite side of said reticle from its side facing said collimating lens;
   said holding means for said pair of tubes comprises a releasable screw device threadably engageable with said tubes at their reseptive telescoping ends;
   said reticle includes a pattern of crossed lines arranged in horizontal and vertical planes perpendicular to each other so as to form a grid;
   said reticle and said diffuser glass are immediately next to each other;
   said diffuser glass is arranged so as to put said reticle at the focal length of said lens thereby placing said reticle at infinity;
   means interposed between said lens tube and said camera for adjustably determining back focal distance including a focus ring for bringing said reticle into focus; and
   indicia carried on said ring and operable with a scale to measure back focal distance.

* * * * *